UNITED STATES PATENT OFFICE.

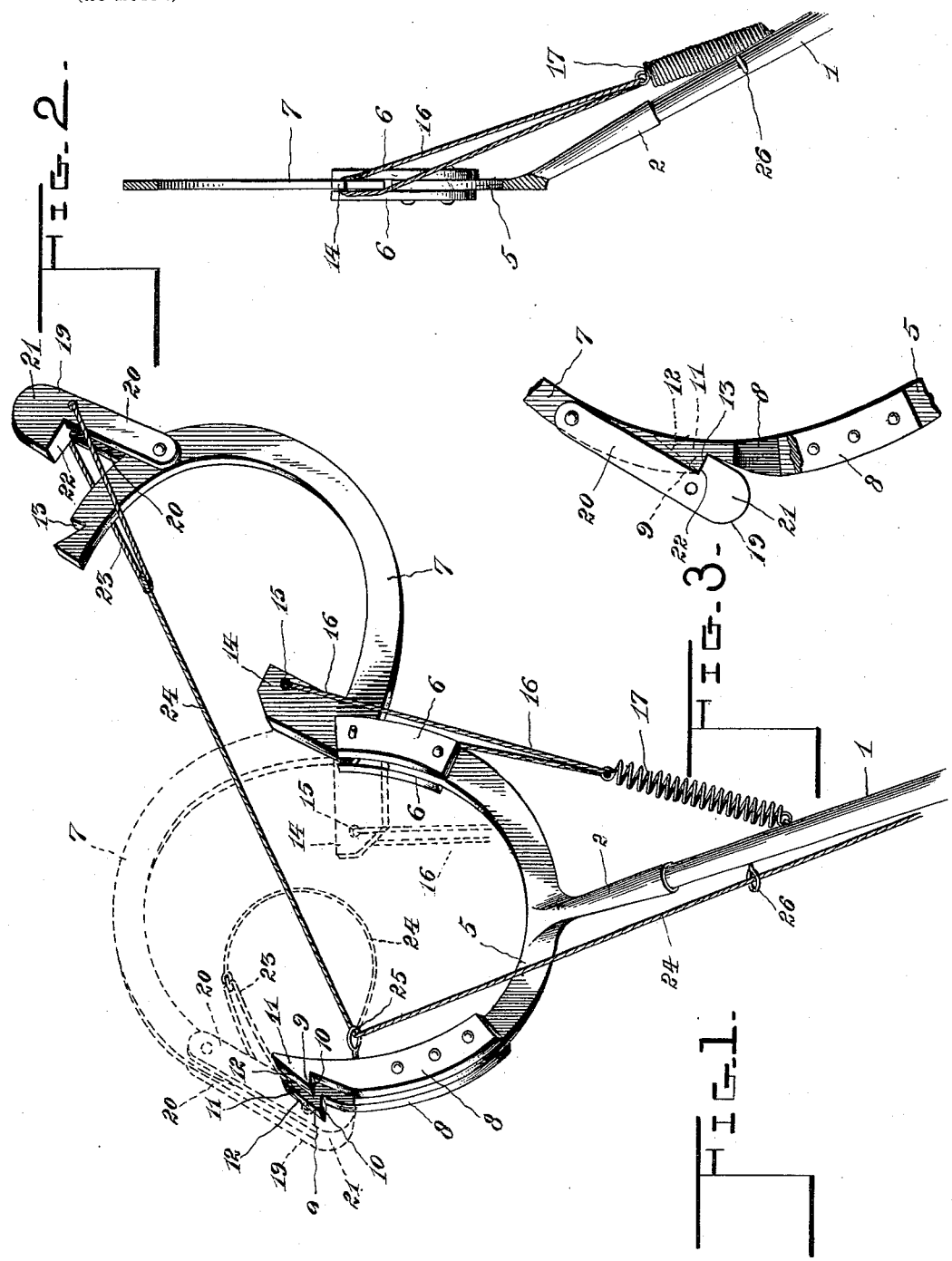

JOHN S. HOLLAND, OF COLOMA, MISSOURI.

ANIMAL CATCHING AND HOLDING IMPLEMENT.

SPECIFICATION forming part of Letters Patent No. 640,199, dated January 2, 1900.

Application filed September 30, 1899. Serial No. 732,217. (No model.)

*To all whom it may concern:*

Be it known that I, JOHN S. HOLLAND, a citizen of the United States, residing at Coloma, in the county of Carroll and State of Missouri, have invented a new and useful Animal Catching and Holding Implement, of which the following is a specification.

This invention relates to animal catching and holding implements, and has for its object to provide a simple and effective device of this character adapted for use on various kinds of animals and embodying positively-acting devices under the control of an operator and in its use avoid injury to the animal.

With these and other objects in view the invention consists in the construction and arrangement of the several parts, which will be more fully hereinafter described and claimed.

In the drawings, Figure 1 is a perspective view of an animal catching and holding implement embodying the features of the invention. Fig. 2 is a longitudinal vertical section through the implement in closed condition and on the line 2 2. Fig. 3 is a detail sectional elevation of a locking part of a device.

Similar numerals of reference are employed to indicate corresponding parts in the several views.

The numeral 1 designates a handle which may be of any preferred form and necessary length and secured in a socket 2, extending upward and with a slight lateral deflection from a curved rigid jaw 5. To one extremity of the jaw 5 hinge-plates 6 are riveted or otherwise fastened and extend beyond the terminal of the said jaw to form an open space between them and pivotally receive the one end of a movable jaw 7. The opposite extremity of the jaw 5 has a seat therein constructed, as shown, in one form by catch-bars 8, firmly secured thereto and having their projecting ends 9 formed with catch-shoulders 10 and reduced tongues 11, having beveled edges 12 adjacent the said shoulders, the seat being provided between the projecting ends of the catch-bars to form a receptive means for the shouldered free end 13 of the movable jaw 7.

The end of the jaw 7 pivotally mounted between the hinge-plates 6 has an inwardly-extending angularly-disposed foot 14, and secured in an opening 15, formed therein near the free extremity and adjacent the edge closest to the said jaw 7, is a doubled cord or other analogous connecting device 16, having its opposite end attached to the front terminal of a retractile spring 17, which is secured at its opposite extremity to the handle 1. The free extremity of the jaw 7 is also supplied with a latch 19, having a bifurcated shank 20, pivotally connected to the said jaw, and a head 21, having a locking-shoulder 22. This latch 19 is freely movable to operate as desired on the said jaw 7 and has secured thereto the front looped end 23 of a pull-cord or analogous device 24. The opposite strands of the looped end 23 embrace the free extremity of the jaw 7, and the said cord 24 is then threaded through an eye or similar guide 25, fixed on the inner portion of the stationary jaw 5 between the position of the catch-bars 8 and close to the open space between the projecting ends of the latter. From the eye or guide 25 the cord 24 is directed toward the handle 1 and threaded through another eye or guide 26, fastened in the handle 1. This cord 24 may be of any suitable length and extend along the handle through suitable guiding devices.

It will be observed that the upward incline of the socket 2 disposes the jaw 5 and the parts carried thereby close to a ground or other surface when the implement is arranged for operation, and in the make-up of the several parts lightness of construction will be of paramount consideration and strong metal used to resist the strain and avoid breakage. It is also intended by the arrangement of the devices in the present implement to avoid contact of the jaws thereof with the leg of the animal trapped and to position the holding means within the confines of the closed jaws.

In the use of the device it is first set, as shown by Fig. 1, and in this arrangement the jaw 7 is drawn outward and thrown over against the resistance of the spring 17, and when the said jaw has been thrown outward far enough to dispose the foot 14 past the pivotal center, with the spring exerting its tension on the jaw outside of said center, said jaw will so remain until the cord 16 is pulled to throw said jaw inward past the pivotal point. The parts being arranged as shown in Fig. 1, the implement is pushed toward the leg of the animal desired to be trapped, and the pressure of the said leg on the taut cord 24 extending across both jaws and at the same time held against slack at the end on the handle, will thereby cause an inward pull on the jaw 7 through the medium of the latch 19, to which said cord is attached. Simultaneously with this inward pull on the jaw 7 the latch 19 is closed over on the jaw 7 and a slight drawing tension exerted on the cord 24, running along the handle 1. As soon as the foot 14 is inward far enough the spring 17 will act to automatically close the jaw 7 and cause the shouldered end 13 thereof to enter the space between the projecting ends of the catch-bars 8, the free end of the jaw 7 striking against the end of the jaw 5 between the tongues 11, and thereby aline the shoulder 13 with the shoulders 10 of said catch-bar, and at the same time the head of the latch 19 is riding upwardly over the reduced ends of the catch-bar and until the shoulder 22 coincides with and locks against the said shouldered end 13 of the jaw 7 and the shoulders 10 of the catch-bar. Simultaneously with the automatic closing operation of the jaw 7 the cord 24, running along the handle 1, is drawn rearward to form the loop around the leg of the trapped animal, as shown by Fig. 1 in dotted lines, and thereby firmly hold the animal with a yielding pressure and avoid injury to the limb. The pressure of the loop formed by the cord 24 around the leg of the trapped animal can be varied at the will of the operator, and after securement by other means the animal may be released from the attaching and holding device. The handle 1 by means of the deflection of the socket 2 is directed approximately in the central line of the loop formed by the cord 16, longitudinally considered, to give a better purchase in holding the trapped animal by means of said cord and handle. The implement will be found very useful for domestic use in catching and throwing hogs, sheep, and the like for various purposes and is also equally well useful in trapping wild animals and may be set like any other trap device and operated from a distance by lengthening the cord 16. To make the cord or connecting device 16 strong and durable, it is looped and the opposite strands disposed on reverse sides of the jaw 5.

Changes in the form, proportions, and minor details of construction may be resorted to without in the least departing from the spirit or sacrificing any of the advantages of the invention.

Having thus described the invention, what is claimed as new is—

1. In an implement of the character set forth, the combination of a handle having a fixed jaw, a movable jaw pivoted to one extremity of the fixed jaw, and a cord connected to the movable jaw and operatively guided in relation to the fixed jaw, said cord being in loose engagement with the fixed jaw and extending along the handle, the said cord being disposed across both jaws and by the operation of the movable jaw, caused to form a loop around the leg of the animal within the confinement of both jaws.

2. In an implement of the character set forth, the combination of a handle, a fixed jaw thereon, a movable jaw attached to one extremity of the fixed jaw, a cord connected to the movable jaw and extending across both jaws in an operative position, said cord being in loose engagement with the fixed jaw and extending along the handle, means for automatically closing the movable jaw after it has passed a certain point, and means for locking both jaws closed.

3. An implement of the character set forth, comprising a movable jaw and a fixed jaw and a cord connected to the movable jaw and extending across both jaws when the movable jaw is open, said cord being in loose engagement with the fixed jaw and continued along the handle and forming a loop within the confinement of the jaws which incloses the leg of the trapped animal.

4. In an implement of the character set forth, the combination of a handle, an arm having a rear angularly-bent end attached to said handle, a fixed jaw secured to said arm, a spring-actuated movable jaw pivoted to one extremity of the fixed jaw, a cord connected to the movable jaw, loosely engaging the fixed jaw and continued along the handle and by opening the movable jaw extended across both jaws, and means for locking the movable jaw closed.

5. In an implement of the character set forth, the combination of a handle, a fixed jaw connected to the handle, a movable jaw having an inwardly-extending angular foot at its point of attachment to the fixed jaw, a spring connected to the handle and said foot, a cord for operating the movable jaw and extended across both jaws when the movable jaw is open, and means for locking the movable jaw closed.

6. In an implement of the character set forth, the combination of a handle, a fixed jaw connected thereto and having catch-bars on one extremity, a movable jaw pivotally attached to the other extremity of the fixed jaw and having its free end shouldered, a latch pivotally mounted on the free extremity of the movable jaw, means for automatically closing the movable jaw after it has passed a certain point, and a cord attached to the latch on the movable jaw and loosely guided adjacent the said catch-bars, said cord being continued along the handle and forming a loop around a leg of the trapped animal.

In testimony that I claim the foregoing as my own I have hereto affixed my signature in the presence of two witnesses.

JOHN S. HOLLAND.

Witnesses:
DANIEL R. BARTLETT,
ROBERT J. PARSLEY.